(12) United States Patent
Watanabe et al.

(10) Patent No.: US 8,189,157 B2
(45) Date of Patent: May 29, 2012

(54) LIQUID CRYSTAL DISPLAY DEVICE AND PROCESS FOR MANUFACTURING THE SAME

(75) Inventors: Yasuhiro Watanabe, Tottori (JP); Takayuki Kato, Tottori (JP); Hajime Nakao, Azumino (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 12/345,224

(22) Filed: Dec. 29, 2008

(65) Prior Publication Data

US 2009/0174852 A1   Jul. 9, 2009

(30) Foreign Application Priority Data

Jan. 7, 2008  (JP) ................... 2008-000354

(51) Int. Cl.
*G02F 1/1343* (2006.01)
(52) U.S. Cl. ........................ 349/141; 349/139
(58) Field of Classification Search .................. None
See application file for complete search history.

(56) References Cited

U.S. PATENT DOCUMENTS 6,600,524 B1 * 7/2003 Ando et al. .................. 349/43

| | | | |
|---|---|---|---|
| 2004/0263722 A1 * | 12/2004 | Oh et al. | 349/106 |
| 2006/0146253 A1 * | 7/2006 | Kang | 349/141 |
| 2007/0070266 A1 * | 3/2007 | Ochiai et al. | 349/106 |

FOREIGN PATENT DOCUMENTS

| | | |
|---|---|---|
| JP | A-2001-83540 | 3/2001 |
| JP | A-2001-235763 | 8/2001 |
| JP | A-2002-182230 | 6/2002 |
| JP | A-2007-226175 | 9/2007 |

* cited by examiner

*Primary Examiner* — Lucy Chien
(74) *Attorney, Agent, or Firm* — K&L Gates LLP

(57) ABSTRACT

A liquid crystal display device including: a pair of substrates with a liquid crystal layer therebetween, one of the substrates carrying scanning lines and signal lines with a first insulation film therebetween adjacent to the liquid crystal layer, switching devices at vicinities of intersections of the scanning lines and the signal lines, an intermediate film overlying an entire surface of a displaying area, first electrodes connected to electrodes of the switching devices via contact hole portions positioned in each region defined by the scanning lines and the signal lines, second electrodes and a second insulation film between the first electrodes and the second electrodes, the electrodes of the switching devices are covered with the intermediate film; channel regions of the switching devices are covered with the second insulation film; and the second electrodes are connected to a common line on an external periphery of the displaying area.

4 Claims, 5 Drawing Sheets

LIQUID CRYSTAL DISPLAY DEVICE AND PROCESS FOR MANUFACTURING THE SAME

BACKGROUND

1. Technical Field

The present invention relates to a liquid crystal display device and a process for manufacturing the same. More particularly, the present invention relates to a liquid crystal display device employing transverse electric field type, in which a layered structure deposited on the substrate thereof is simplified and a channel region is securely insulated and moisture resistant, and also to a process for manufacturing the same.

2. Related Art

A widely used type of liquid crystal display devices is a vertical electric field type. Typically the liquid crystal display device of the vertically electric field type is configured to have a pair of transparent substrates on each of which an electrode unit and the like are formed and a liquid crystal layer sandwiched between the pair of transparent substrates. In operation, voltages are applied to electrodes on both substrates so as to reorient molecules of the liquid crystal for displaying various types of information. Such liquid crystal display device employing the vertical electric field type generally uses twisted nematic (TN) type, however such device undesirably exhibits a narrow viewing angle. Accordingly, the liquid crystal display device implementing other improved vertical electric field type has been developed. The improved vertical electric field type is typified by a vertical alignment (VA) type and a multidomain vertical alignment (MVA) type.

On the other hand, there have been also known liquid crystal display devices which employ an in-plane switching (IPS) type or a fringe field switching (FFS) type with a pair of electrodes formed on only one substrate, one electrode unit serving as pixel electrodes and the other electrode unit serving as a common electrode, unlike above mentioned liquid crystal display device of the vertical electric field type.

In the IPS-type liquid crystal display device, the pair of electrode units are formed on a common layer and an electric field is applied to a liquid crystal substantially in parallel with a substrate so as to reorient molecules of the liquid crystal substantially in parallel with the substrate. Therefore, the IPS-type liquid crystal display device is also called "liquid crystal display device of transverse electric field type" and advantageously exhibits a much wider viewing angle comparing to the foregoing liquid crystal display device of the vertical electric field type. However, in the IPS-type liquid crystal display device, the pair of electrode units for applying the electric field to the liquid crystal are formed on the common layer. Such structure hampers activation of liquid crystal molecules distributed in a region above and away from the pixel electrodes, so that transmittance and the like are disadvantageously decreased.

To obviate such disadvantage of IPS-type liquid crystal display device, there has been developed a so-called diagonal electric field type, or a FFS type (see JP-A-2001-235763 and JP-A-2002-182230). This FFS-type liquid crystal display device has a pixel electrode unit and a common electrode unit for applying an electric field to a liquid crystal layer thereof, each electrode unit being formed on different layers with an insulating layer (hereinafter referred to as "electrodes-insulation film") sandwiched therebetween.

The FFS-type liquid crystal display device exhibits a wider viewing angle and higher contrasts than that of the IPS-type liquid crystal display device. Further, the FFS-type liquid crystal display device can exhibit a brighter display due to its higher transmittance while being capable of an operation at a low voltage. Also, in the FFS-type liquid crystal display device, an area in which the pixel electrode unit and the common electrode unit overlap is wider than that of the IPS-type liquid crystal display device, when viewed in plan. Such structure subsidiary generates higher supplemental capacity, whereby a line for supplying supplemental capacity does not need to be prepared separately, so that the FFS-type liquid crystal display device can exhibit higher aperture ratio.

However, the FFS-type liquid crystal display device disclosed in JP-A-2001-235763 and JP-A-2002-182230 causes electric potential difference between signal lines and the pixel electrode unit, that results in an irregular alignment of the liquid crystal molecules in vicinities of the signal lines. Therefore regions of the liquid crystal located in the vicinities of the signal lines are not substantially used for display, so that the aperture ratio disadvantageously decreases. Moreover, a capacitive coupling occurs between the signal line and the pixel electrode unit, leading to, for example, a crosstalk which impairs displaying quality. Further more, layers overlying the substrate are plural in number, so unevenness, or bumps are generated on the pixel electrode unit and a surface of the substrate, and that causes inequalities of a cell gap formed thereon. In order to address these problems, it has been proposed to employ a film as an intermediate layer used in the VA-type or MVA type liquid crystal display device and to arrange the pixel electrode unit and the common electrode unit on this film, to thereby decrease adverse effects of the electric potential of the signal line while minimizing the size of the bumps on the substrate surface (see JP-A-2001-83540 and JP-A-2007-226175).

In the liquid crystal display device disclosed in JP-A-2001-83540 and JP-A-2007-226175, the intermediate film is formed to obtain the high aperture ratio. The intermediate film is formed in the same manner as that of the liquid crystal display device of the transverse electric field type disclosed in JP-A-2001-235763 and JP-A-2002-182230. More particularly, the intermediate film is deposited on a surface of a passivation film deposited to overlie an entire displaying area including channel regions of switching devices, the passivation film being made from resin such as acrylic resin.

Although the aperture ratio is improved in the liquid crystal display device disclosed in JP-A-2001-83540 and JP-A-2007-226175, manufacturing this type of liquid crystal display device requires depositing many film structures on one of the transparent substrate thereof, so that many manufacturing process steps are unavoidably needed, resulting in high costs.

Incidentally, the switching device used in such liquid crystal display device has a characteristic variability under exposure to outside moisture, oxygen and so forth. In view of the foregoing, the liquid crystal display device of the transverse electric field type disclosed in JP-A-2001-235763 and JP-A-2002-182230 employs a intermediate film formed from photosensitive resin or the like and deposited overlying a passivation film which is formed to secure insulation and moisture resistant properties of channel regions of switching devices.

Both passivation film and intermediate film are deposited also in the liquid crystal display device of the transverse electric field type disclosed in JP-A-2001-83540 and JP-A-2007-226175, as is the case with the liquid crystal display device of JP-A-2001-235763 and JP-A-2002-182230. However, the channel region and the like of the switching device are covered not only by an insulation film of two layers, i.e. the passivation film and the intermediate film, but also by an electrodes-insulation film formed between pixel electrode unit and common electrode unit in the liquid crystal display device of the transverse electric field type disclosed in JP-A-2001-83540 and JP-A-2007-226175. That is, the cannel regions of the switching devices of the liquid crystal display device of the transverse electric field type are covered with three-layered insulation film formed of the passivation film, the intermediate film, and the electrodes-insulation film.

Therefore, the number of the manufacturing process steps is undesirably increased from that of the typical liquid crystal display device of the transverse electric field type, in the liquid crystal display device of the transverse electric field type disclosed in JP-A-2001-83540 and JP-A-2007-226175.

Inventors of the application have kept persistent diligence in investigation of the structure of the liquid crystal display device of the transverse electric field type, discovered that purpose for forming the passivation film, or securing insulation and water resistant properties, is attained by the electrodes-insulation film because the electrodes-insulation film and the passivation film are formed of the same material such as silicon nitride, and accomplished the present invention.

SUMMARY

An advantage of some aspects of the invention is that a liquid crystal display device of transverse electric field type of which a structure of a film deposited on a substrate can be simplified, insulation property and moisture resistance of a channel region can be secured and a manufacturing cost is low, and a process for manufacturing the same is provided.

To achieve the advantage, the liquid crystal display device of the present invention has a pair of transparent substrates which clamp a liquid crystal layer therebetween, one of the transparent substrates carrying a plurality of scanning lines and signal lines arranged in matrix with a first insulation film therebetween on a surface adjacent to the liquid crystal layer thereof, switching devices made of a thin film transistor, the switching devices being positioned at vicinities of intersections of the scanning lines and the signal lines, an intermediate film overlying a entire surface of a displaying area, first electrodes made of a transparent conductive material and connected to electrodes of the switching devices via contact hole portions formed through the intermediate film each contact hole portion positioned in each of regions defined by the scanning lines and the signal lines, second electrodes made of a transparent conductive material, and a second insulation film sandwiched between the first electrodes and the second electrodes, wherein the electrodes of the switching devices are directly covered with the intermediate film; wherein channel regions of the switching devices are directly covered with the second insulation film at opening portions formed in the intermediate film; and wherein the second electrodes are, as a unit, connected to a common line wired on an external periphery of the displaying area.

The liquid crystal display device of the invention has, on its displaying area, the plurality of scanning lines and the plurality of signal lines arranged in matrix with the first insulation film therebetween, the first electrodes and the second electrodes with the plurality of slits, both facing each other with the second insulation film therebetween and being made of the transparent conductive material, each pair of the first and second electrodes being formed in each region defined by scanning lines and the signal lines on the intermediate film. With this arrangement, the liquid crystal display device of the present invention can be operated as a FFS-type liquid crystal display device. Additionally, indium tin oxide (ITO) or indium zinc oxide (IZO) may be employed as the transparent conductive material.

Moreover, formed on the intermediate film are the first electrodes and the second electrodes with the plurality of slits, both facing each other with the second insulation film therebetween and being made of the transparent conductive material. Therefore, capacitance between a source line (signal line) and a pixel electrode can be lowered, so that the pixel electrode can extend above the source line, whereby the liquid crystal display device can exhibit high aperture ratio. Note that the first electrodes are connected to the switching devices so as to be the pixel electrodes, and the second electrodes are, as a unit, electrically connected to the common line so as to be the common electrode in the liquid crystal display device of the invention.

Furthermore, surfaces of the switching devices are directly covered with the intermediate film in the liquid crystal display device of the invention, while a typically used passivation film is not formed. Also, each of the channel regions of the switching devices is covered with the second insulation film via the opening portion formed in the intermediate film. With this arrangement, a purpose for forming the passivation film, or securing insulation and water resistant properties, is attained by the second insulation film, whereby undesired changes in properties can be prevented or at least suppressed without forming the passivation film. Therefore, the liquid crystal display device of the invention can be simplified and manufactured at low cost since the passivation film is not formed.

Additionally, the second insulation film may be preferably made of an inorganic transparent insulation material.

When employing inorganic transparent insulation materials, especially silicon nitride ($SiN_x$) or silicon oxide ($SiO_2$) as the material of the second insulation film, adhesive performance between a semiconductor layer which forms the channel region of the switching device of the TFT and the second insulation film is improved, because the semiconductor layer is made of silicon based material such as amorphous silicon (a-Si) or low temperature poly silicon (LTPS). Therefore, undesired changes in properties of the channel region are suppressed, and thus the properties of the channel region is stabilized. Additionally, the amorphous silicon and the LTPS are generally used as the semiconductor layer, also, the silicon nitride and silicon oxide are generally used as the insulation film. The second insulation film of the silicon nitride may be preferably used in view of the insulation property and water resistance.

Also, it may be preferable that the thickness of the second insulation film of the liquid crystal display device of the invention is in a range of 2000 angstrom to 6000 angstrom.

It is difficult to secure a necessary insulation property and water resistance if the second insulation film having a thickness of less than 2000 angstrom is used, so the second insulation film of the thickness of less than 2000 angstrom is not preferable. Also, capacitance between the first electrodes and the second electrodes is lowered if the second insulation film having a thickness exceeding 6000 angstrom is used, so that flickering happens more often and a necessary voltage for activating the liquid crystal is increased, so the second insulation film of the thickness exceeding 6000 angstrom is not preferable.

A process for manufacturing a liquid crystal display device, including the steps of: a first step in which a transparent substrate is prepared as a first transparent substrate, the trans parent substrate having a plurality of scanning lines and signal lines arranged in matrix with a first insulation film therebetween and in a displaying area, switching devices made of a thin film transistor, the switching devices being positioned at vicinities of intersections of the scanning lines and the signal lines, and a common line formed along a periphery of the displaying area; a second step in which an intermediate film is formed by forming a film made of a photosensitive resin material overlying an entire surface of the transparent substrate that has undergone the first step, and then conducting exposing, developing and baking so that the intermediate film overlying an entire displaying area is formed, the intermediate film having contact hole portions and opening portions so that electrodes and channel regions of the switching devices are exposed; a third step in which first electrodes made of a transparent conductive material are formed in regions defined by the plurality of scanning lines and the plurality of signal lines, each first electrode being positioned in each region, and each of the first electrodes and each of the switching devices are electrically connected via the contact hole portions; a fourth step in which a second insulation film is deposited on an entire surface of the intermediate film including positions corresponding to the first electrodes and the channel regions; a fifth step in which second electrodes made of a transparent conductive material are formed at positions corresponding to the regions defined by the plurality of scanning lines and the plurality of the scanning lines and the plurality of the signal lines, each of the second electrodes having a plurality of slits; and a sixth step in which an alignment layer is deposited on the surface of the first transparent substrate that has undergone the fifth step, a second transparent substrate is positioned with facing the first transparent substrate, and bonded to the first transparent substrate with being separated at a predetermined distance, and a liquid crystal is received between the first transparent substrate and the second transparent substrate.

According to the process for manufacturing the liquid crystal display device of the present invention, the electrodes of the switching devices are directly covered with the intermediate film, and the channel regions of the switching devices are directly covered with the second insulation film. Therefore, process steps able to be eliminated are a process step for depositing the passivation film and a process step for etching the passivation film on the electrodes of the switching devices for electrically connecting the electrodes of the switching devices and the first electrodes. Therefore, according to the process for manufacturing the liquid crystal display device of the invention, manufacturing process steps are considerably reduced. Moreover, the channel regions of the switching devices are directly covered with the second insulation film of the same material as the typical passivation film, thereby safely exhibiting the insulation property and the water resistance.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the drawings, the best mode for carrying out the invention now will be described. Note that the following embodiment is exemplary illustrating the liquid crystal display device of the FFS type and manufacturing process for the same as an example of the liquid crystal display device and the manufacturing process for the same, and therefore, it is not aimed at indicating exclusively the liquid crystal display device of the FFS type, whereby other embodiments are also applicable in the scope of the claims.

Figure 1:
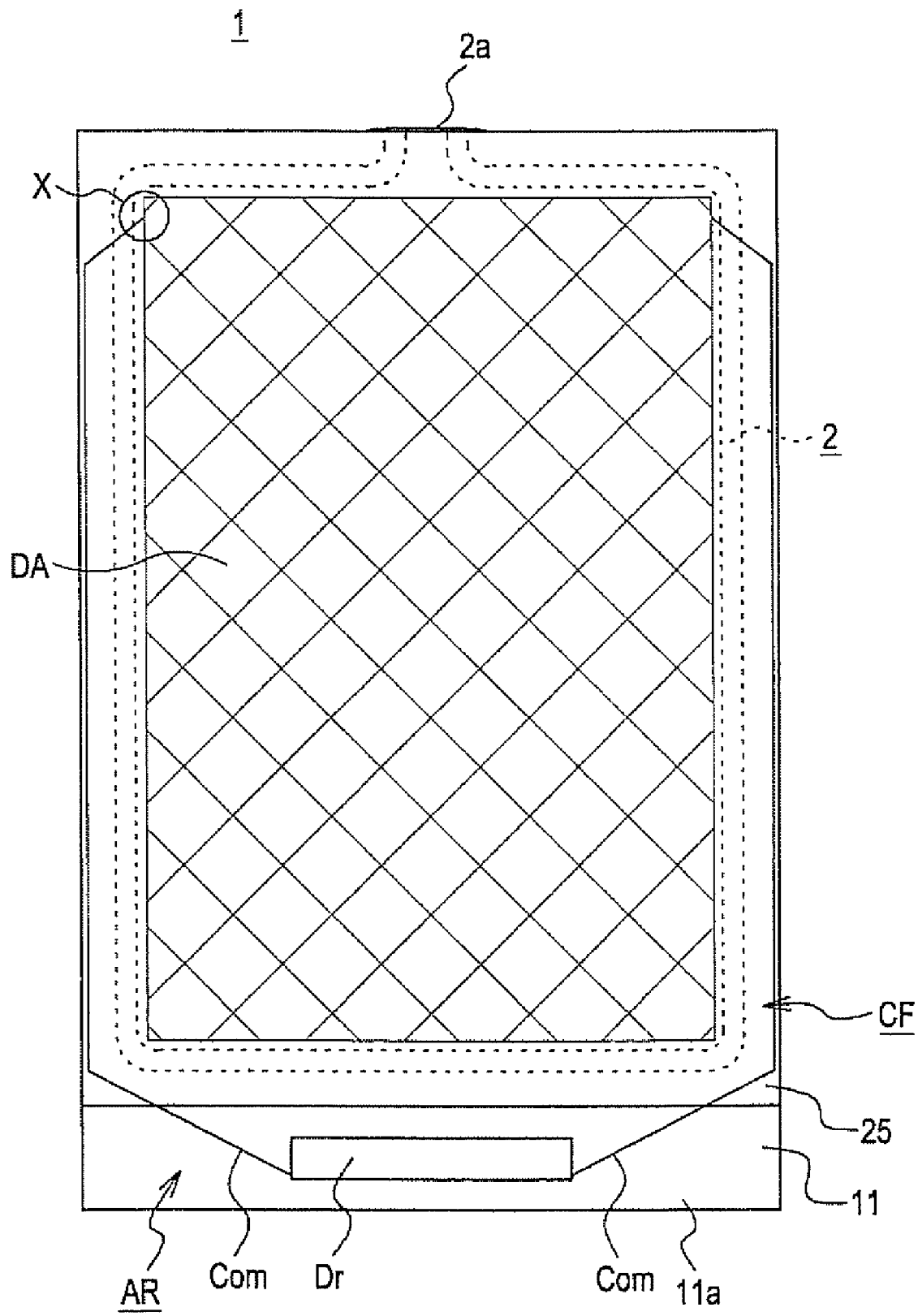
FIG. 1 is a plan view of a liquid crystal display device of FFS type according to an embodiment of the present invention.
Figure 2:
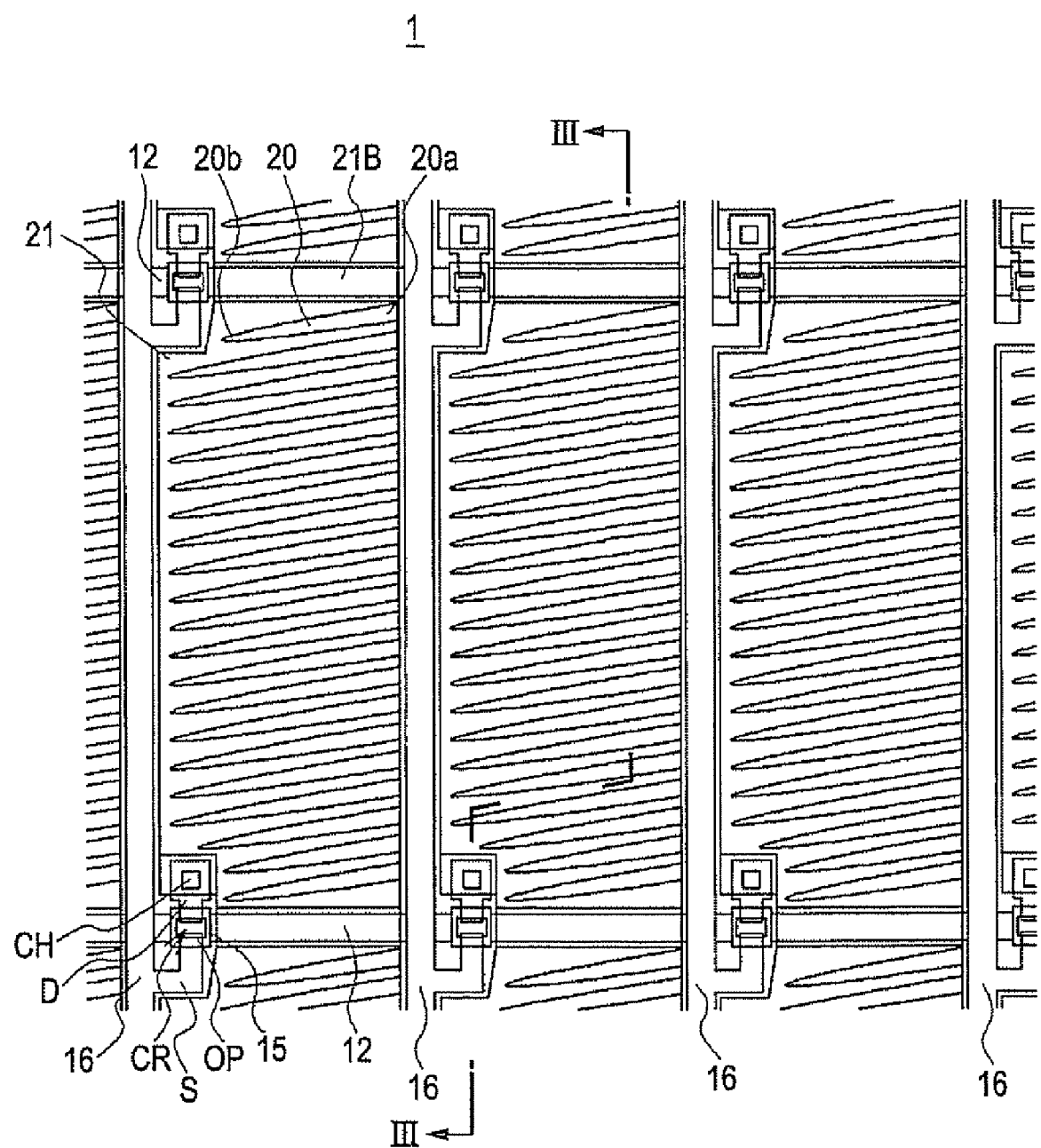
FIG. 2 shows perspectively a color filter substrate for three pixels of the liquid crystal display device in FIG. 1 in a greater scale.
Figure 3:
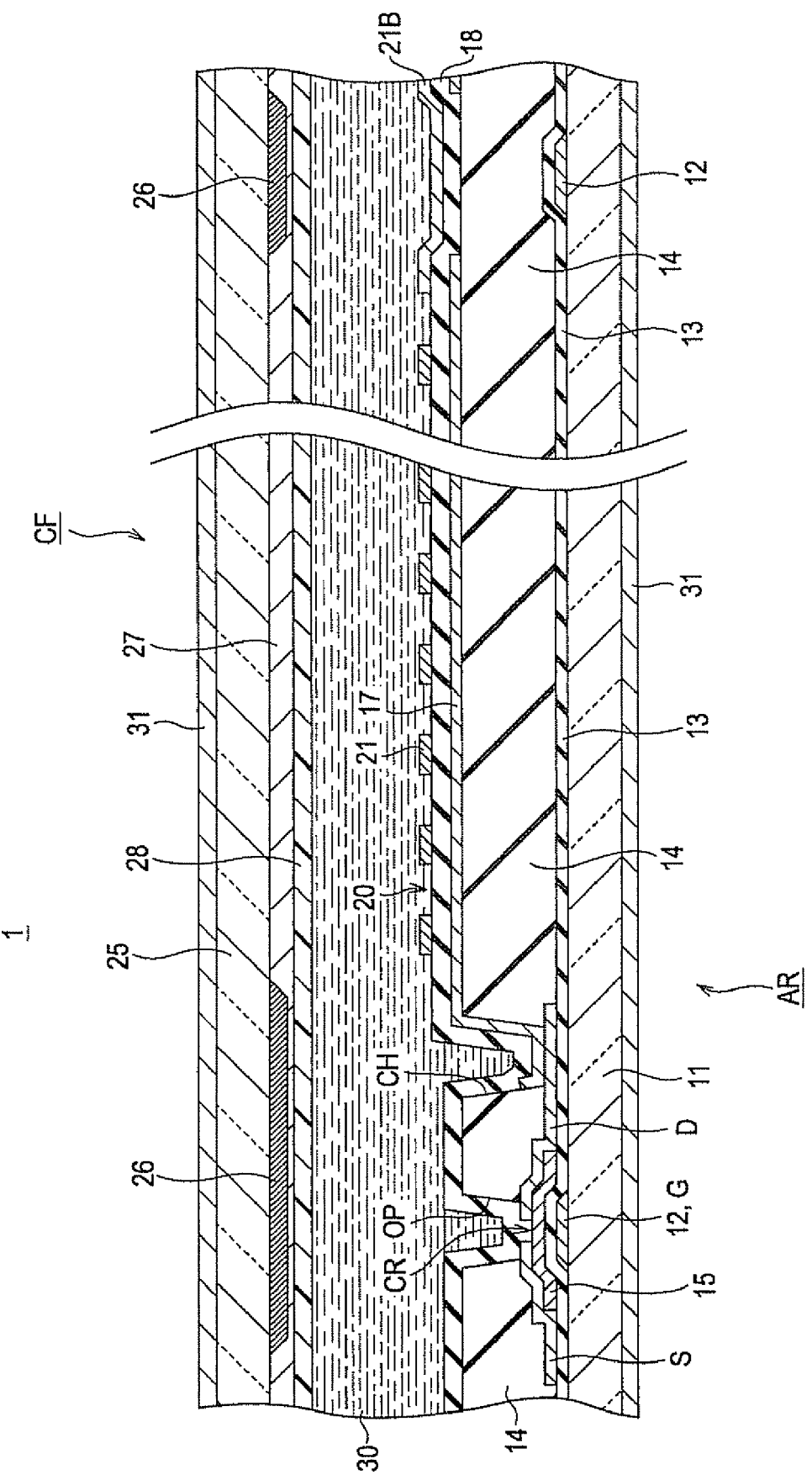
FIG. 3 is a sectional view taken along line III-III of FIG. 2.
Figure 4A:
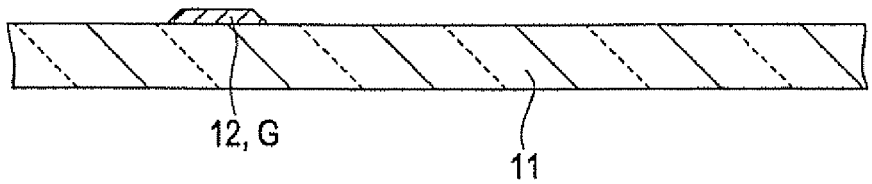
FIG. 4A is a sectional view of the essential parts for illustrating manufacturing process steps of an array substrate.
Figure 4B:
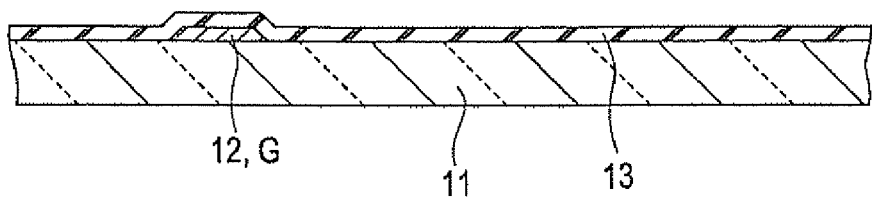
FIG. 4B is a sectional view of the essential parts for illustrating manufacturing process steps of the array substrate.
Figure 4C:
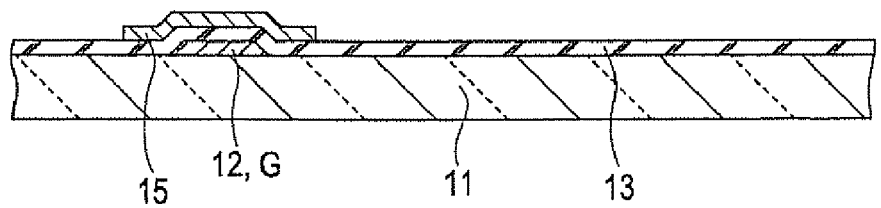
FIG. 4C is a sectional view of the essential parts for illustrating manufacturing process steps of the array substrate.
Figure 4D:
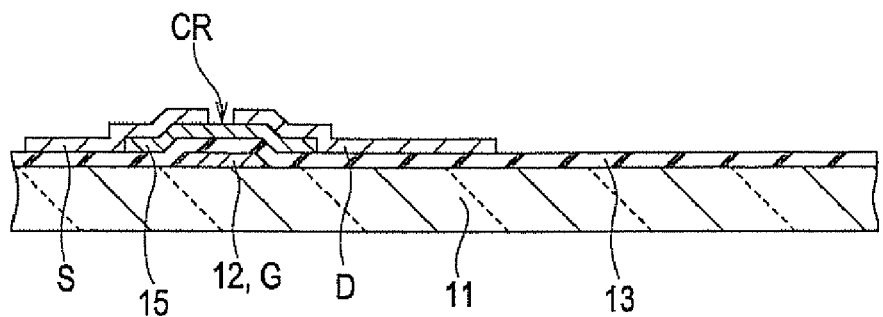
FIG. 4D is a sectional view of the essential parts for illustrating manufacturing process steps of the array substrate.
Figure 4E:
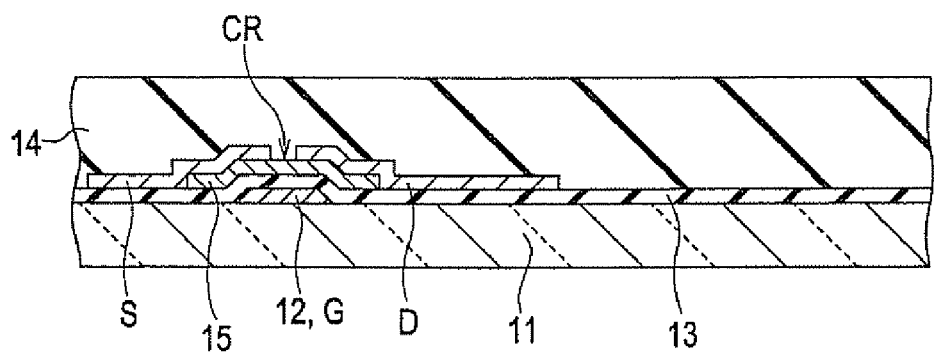
FIG. 4E is a sectional view of the essential parts for illustrating manufacturing process steps of the array substrate.

FIG. 1 is a plan view of a liquid crystal display device of FFS type according to an embodiment of the present invention. FIG. 2 shows perspectively a color filter substrate for three pixels of the liquid crystal display device in FIG. 1 in a greater scale. FIG. 3 is a sectional view taken along line III-III of FIG. 2. FIGS. 4A to 4E and 5A to 5E are sectional views of the essential parts for illustrating manufacturing processes of an array substrate.

Note that the word "surface" of an array substrate or a color filter substrate indicates the side on which various lines are formed or the side facing a liquid crystal. Also, each of layers and components is illustrated in different reduction scale from each other so that the layers and the components are visible in the size in each drawing, and not in proportional to the exact size in the figures used for the illustration of the specification.

First Embodiment

A liquid crystal display device 1 according to the embodiment is a so-called chip on glass (COG) type liquid crystal display device which includes an array substrate AR (first transparent substrate), a color filter substrate CF, a sealing member 2 laminating the array substrate AR and the color filter substrate CF, and liquid crystal 30 (see FIG. 3) enclosed in a region defined by the array substrate AR, the color filter substrate CF and the sealing member 2. In this liquid crystal display device 1, a region surrounded by the sealing member 2 forms a displaying area DA and the outside of the displaying area DA serves as a frame area. The sealing member 2 has an inlet 2a for injection of the liquid crystal 30. Referring to FIG. 1, the region corresponding to the displaying area DA has a grid-like hatch pattern.

The array substrate AR is configured with a transparent substrate 11 having various lines thereon. The array substrate AR is longer than the color filter substrate CF in its longitudinal direction, and thus, an extending portion 11a which extends outwardly is formed with a state in which both substrates AR and CF is laminated. The extending portion 11a carries an IC chip for outputting a driving signal or a driver Dr configured with LSI or the like. In the frame region of the array substrate AR, various routing lines (not shown in figures) are formed for sending various signals from the driver Dr to later described scanning lines 12 and signal lines 16 (see FIG. 2), and furthermore, common lines Com connected to later described common electrode (a group of upper electrodes) 21 are formed.

Next, structures of the substrates will now be described with referring to FIGS. 2 and 3. The plurality of scanning lines 12 each being parallel to each other are formed on the transparent substrate 11 as shown in FIGS. 2 and 3. Each scanning line 12 is formed of a two-layered line of a molybdenum (Mo) layer and an aluminum (Al) layer. Also, the entire surface of the transparent substrate 11 carrying the scanning lines 12 formed thereon is covered with the gate insulation film (a first insulation film) 13. The gate insulation film 13 is formed with inorganic transparent insulation material such as silicon nitride, silicon oxide or the like. On the surface of the gate insulation film 13, a semiconductor layer 15 of an amorphous silicon (a-Si) layer is formed at a region in which a switching device (e.g. thin-film transistor, or TFT) is formed. A region in which the semiconductor layer 15 is formed on the scanning line 12 forms a gate electrode G of TFT.

The signal line 16 and a drain electrode D are formed on the surface of the gate insulation film 13. The signal line 16 includes a source electrode S formed of a conductive layer having a tree-layer structure in which, for example, aluminum (Al) layer is sandwiched between molybdenum (Mo) layers. Both source electrode S and drain electrode D of the signal line 16 partially overlap the surface of the semiconductor layer 15. The entire surface of the array substrate AR is covered with an intermediate film 14 made of a photosensitive material, and also, a contact hole portion CH and an opening portion OP are formed at positions corresponding to the drain electrode D and the channel region CR, respectively.

A lower electrode (first electrode) 17 is formed on the intermediate film 14 in each of the regions defined by the scanning lines 12 and the signal lines 16. The lower electrode 17 is formed of transparent conductive material such as indium tin oxide (ITO) or indium zinc oxide (IZO). The lower electrode 17 is electrically connected to the drain electrode D via the contact hole portion CH. Therefore, the lower electrode 17 functions as a pixel electrode. An electrodes-insulation film (second insulation film) 18 is formed overlying the lower electrode 17. Inorganic transparent insulation material exhibiting high insulation property such as the silicon nitride is employed as a material of the electrodes-insulation film 18. An upper electrode 21 having a plurality of slits 20 is formed on the electrodes-insulation film 18 in the region defined by the scanning lines 12 and the signal lines 16. The upper electrode 21 is formed of transparent conductive material such as indium tin oxide (ITO) or indium zinc oxide (IZO). Additionally, the upper electrode 21 is formed in every pixel region, each adjacent upper electrode 21 being linked to each other via a connecting portion 21B. The upper electrodes 21, as a unit, are electrically connected to the common lines Com of which one ends extend, for example, to positions X in the frame area as shown in FIG. 1. The other ends of the common lines Com are connected to the driver Dr. An alignment layer (not shown) is formed on the entire surface of the substrate.

Each of the upper electrodes 21 is located in each of the regions defined by scanning lines 12 and signal lines 16, having the slits 20 formed therein to have, for example, a combed shape when seen from plan view. One ends of the slits 20 which are located adjacent to the signal line 16 are open ends 20a having greater width than the other ends, or close ends 20b. With this structure, aperture ratio of a region of the open end 20a is improved allowing brighter display.

Also, the color filter substrate CF has the a transparent substrate 25, shielding members 26 which is laminated on the surface of the transparent substrate 25 and overlies positions corresponding to the scanning lines 12, the signal lines 16 and the TFTs. A color filter layer 27 of a plurality of colors, for example, three colors of red (R), green (G) and blue (B) is formed in a region surrounded by the shielding member 26 on the surface of a transparent substrate 25. A protective film 28 formed of transparent resin or the like is laminated on the surface of the shielding member 26 and the color filter layer 27. A certain alignment layer (not shown) is laminated over the entire surface of the substrate. Additionally, polarizing plate 31 is provided on both exterior surfaces of such structure formed with the array substrate AR and the color filter substrate CF.

Now, referring to FIGS. 4A to 4E and 5A to 5D, manufacturing process for the array substrate AR is described. Firstly, the pluralities of scanning lines 12 are patterned by known method such as a photolithography (see FIG. 4A). Secondly, the gate insulation film 13 is deposited on the transparent substrate 11 including the scanning line 12, by known method such as a plasma chemical-vapor deposition (CVD) or a sputtering (see FIG. 4B). Following this, the semiconductor layer 15 is patterned by known method such as the photolithography (see FIG. 4C). After that, the pluralities of signal lines 16 intersecting the scanning lines 12 are patterned and the source electrode S and the drain electrode D are formed by known method such as the photolithography (see FIG. 4D) One ends of both source electrode S and drain electrode D overlap the semiconductor layer 15. The preceding process steps are, as a whole, corresponding to a first step of the manufacturing process for the liquid crystal display device of the present invention.

In this first step, a portion of the scanning line 12 overlapping the semiconductor layer 15 when seen from plan view forms the gate electrode G, so that the TFT of an inverse stagger type is formed as the switching device. Additionally, the TFT is formed by so-called channel-etching method with which the source electrode S and the drain electrode D are directly superposed on the semiconductor layer 15 to form the TFT. The channel region CR is the region formed between the end of the source electrode S, which is superposed on the semiconductor layer 15; and the end of the drain electrode D, which is superposed on the semiconductor layer 15.

In the typical liquid crystal display devices, the passivation film is deposited by the known method such as the plasma CVD method and the sputtering method, being made of silicon nitride or silicon oxide, so as to overlie the entire surface of the transparent substrate 11 on which the TFT is formed. In contrast with this, the intermediate film 14 is directly formed on the surface of the transparent substrate 11 on which the TFT is formed, without depositing the passivation film in the present invention. More particularly, a film of photosensitive material such as photoresist coating is laminated on the surface of the transparent substrate 11 with the TFT formed thereon (see FIG. 4E), and after prebaking, the film is exposed by typical aligner and developed so that the intermediate film 14 is formed in the displaying area. After that, a photoreaction process and a baking process are conducted. Therefore, the intermediate film 14 is formed so as to directly overlie the surface of the channel region CR of the TFT, the source electrode S and the drain electrode D.

The photoreaction process is conducted for improving transparency of a photosensitive resin film, under which photosensitive functional groups are irradiated with UV light so as to cause photoreaction. The baking process is the process under which the photosensitive resin patterned is fired by heating so that the resin is formed on the substrate as a both chemically and physically stable insulation film by causing chemical reactions (mainly, crosslinking reaction) within the resin. It is preferable that the thickness of the formed intermediate film 14 is in the range of 1.5 μm to 3.0 μm. If the intermediate film 14 has a thickness of less than 1.5 μm, unevenness is caused at the position in which the TFT or the like exists, leading to bumps of the lower electrode 17 and the upper electrode 21 formed in the following steps, so that a cell gap becomes disadvantageously uneven. If the intermediate film 14 has a thickness of more than 3.0 μm, a higher optical absorption rate is caused, disadvantageously causing the displaying area DA to be darker.

Formed through the intermediate film 14 at the position corresponding to the drain electrode D and the channel region are the contact hole portion CH and the opening portion OP, respectively (see FIG. 5A), during the formation of the intermediate film 14. The contact hole portion CH and the opening portion OP are directly formed when the intermediate film 14 being exposed and developed without forming the passivation film. In the typical process, the drain electrode D could not be exposed to the exterior without being subjected to the etching step for removing the laminated passivation film of the position at the contact hole portion CH. However, in the present invention, the drain electrode D can be exposed to the exterior without the etching step. Also, the channel region CR is exposed to the exterior through the opening portion OP. These process steps, as a whole, correspond to a second step of the manufacturing process for the liquid crystal display device of the present invention.

Next, the lower electrode 17 is formed overlying each of the pixel regions defined by the scanning lines 12 and the signal lines 16 (see FIG. 5B) In this process, part of each lower electrode 17 is deposited inside of the contact hole portion CH so as to electrically connected to the drain electrode D. Therefore, the lower electrodes 17 are operated as the pixel electrodes. Additionally, the lower electrode 17 is not deposited inside of the opening portion OP. This process step corresponds to a third step of the manufacturing process for the liquid crystal display device of the present invention.

Figure 5A:
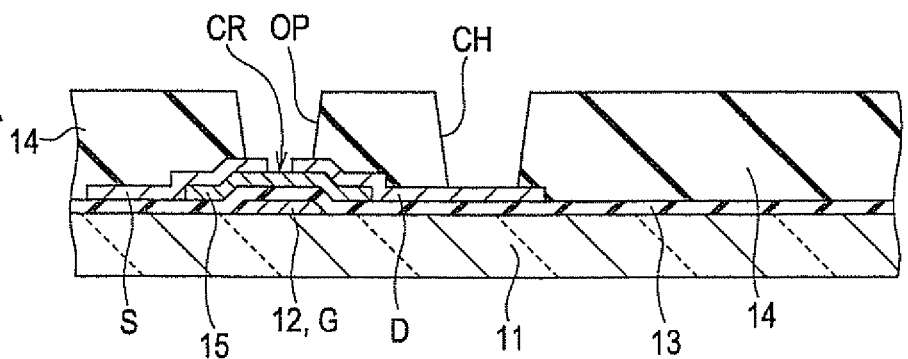
FIG. 5A is a sectional view of the essential parts for illustrating manufacturing process steps of the array substrate.
Figure 5B:
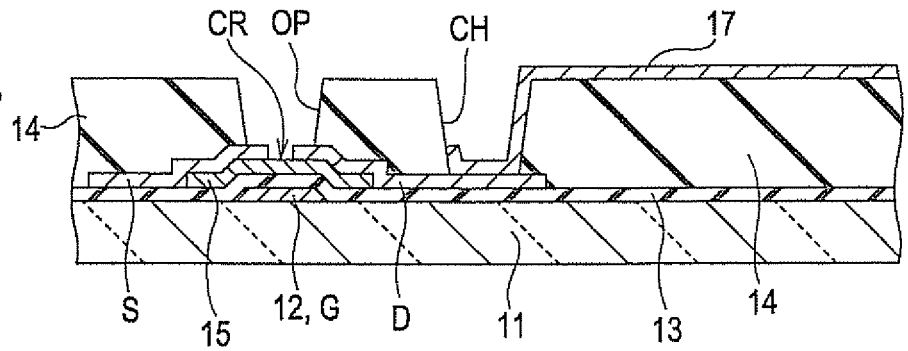
FIG. 5B is a sectional view of the essential parts for illustrating manufacturing process steps of the array substrate.
Figure 5C:
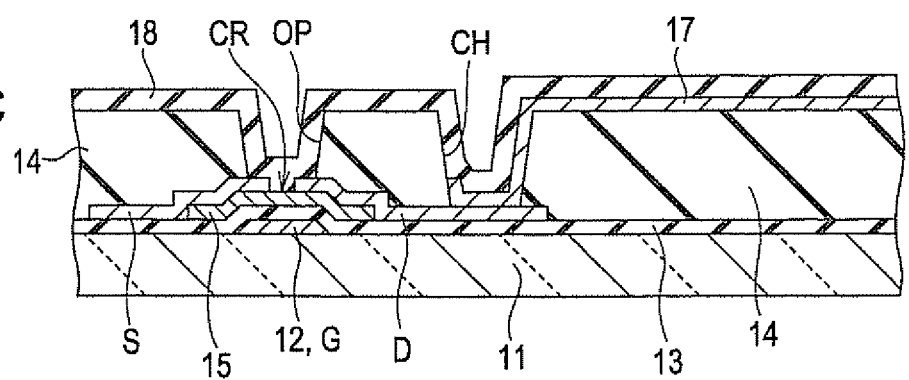
FIG. 5C is a sectional view of the essential parts for illustrating manufacturing process steps of the array substrate.

The electrodes-insulation film 18 is deposited so as to overlie the entire substrate on which the lower electrodes 17 are formed (see FIG. 5C). A material having high insulation property such as the silicon nitride may be employed for the electrodes-insulation film 18 to reduce the thickness of the electrodes-insulation film 18 so that it can be prevented or at least suppressed an undesirable increase of the interior diameter of the contact hole portion CH. Also, a material which can be deposited under relatively low temperature may preferably be used for the electrodes-insulation film 18 so as to be deposited without exerting a harmful effect. Additionally, the electrodes-insulation film 18 is deposited on the inside of the opening portion OP so that the channel region CR is directly covered therewith. Therefore, the thickness of the electrodes-insulation film 18 may preferably be more than 2000 angstrom so that the moisture resistance and insulation property of the channel region CR of the TFT, the source electrode S and the drain electrode D are secured. With the thickness of the electrodes-insulation film 18 exceeding 6000 angstrom, capacitance between the lower electrode 17 and the upper electrode 21 becomes lower, resulting in remarkable flicker phenomenon and higher voltage necessary for activating the liquid crystal molecules, therefore, it is not preferable to use the electrodes-insulation film 18 having the thickness of more than 6000 angstrom. This process step corresponds to a fourth step of the manufacturing process for the liquid crystal display device of the present invention.

Figure 5D:
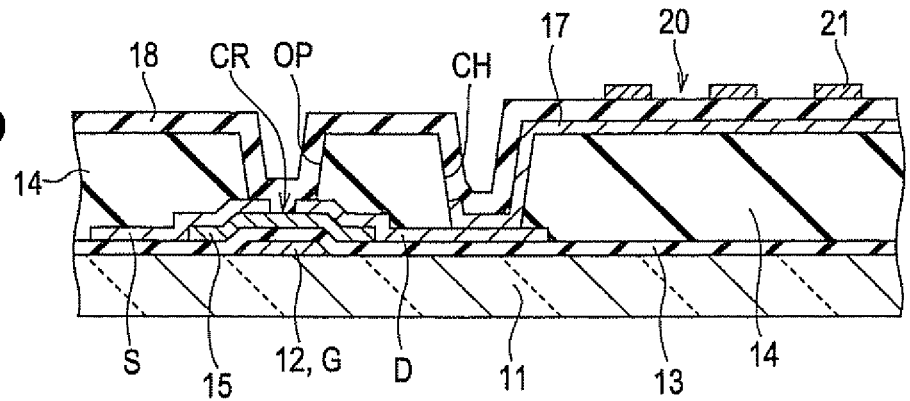
FIG. 5D is a sectional view of the essential parts for illustrating manufacturing process steps of the array substrate.

After forming the electrodes-insulation film 18 in the way as described before, the upper electrode 21 having the pluralities of slits 20 formed therein is formed (see FIG. 5D). The upper electrode 21 is formed by laminating the transparent conductive material such as indium tin oxide (ITO) and indium zinc oxide (IZO) overlying the entire surface of the electrodes-insulation film 18 and by conducting the known photolithography method and etching method. Referring to the FIGS. 2 and 3, each upper electrode 21 is formed on the region except the position corresponding to the TFT and connected to another upper electrode 21 of the adjacent pixel region via the connecting portion 21B. The upper electrodes 21 are, as a unit, electrically connected to the common lines Com wired on the frame region of the liquid crystal display device 1. Therefore, the upper electrodes 21, as a unit, operate as the common electrode. The array substrate AR is completed by forming the alignment layer overlying the entire surface of the transparent substrate 11 on which the upper electrodes 21 are formed. This process step corresponds to a fifth step of the manufacturing process for the liquid crystal display device of the present invention.

Finally, the liquid crystal display device 1 of the first embodiment is completed by bonding before described array substrate and the color filter substrate with each surface facing each other to receive the liquid crystal therebetween. The color filter substrate is substantially the same as that of the typical FFS-type liquid crystal display device. This process step corresponds to a sixth step of the manufacturing process for the liquid crystal display device of the present invention.

As described before, in the liquid crystal display device 1 of the present invention, the intermediate film 14 is formed without the formation of the passivation film, and the channel region CR of the TFT is covered with the electrodes-insulation film 18 directly. Therefore, the channel region CR is covered with the electrodes-insulation film 18 made of the inorganic transparent insulation material which is the same material as that used in the passivation film, thereby being securely and efficiently insulated and water proofed. Also, not necessarily conducted are depositing of the passivation film and the etching of part of the passivation film for exposing the drain electrode D to the exterior, according to the process for manufacturing the liquid crystal display device 1 of the present invention. Therefore, according to the process for manufacturing the liquid crystal display device 1, it is possible to facilitate the manufacturing process, and hence, to manufacture the liquid crystal display device at a low cost.

Exemplary described in the foregoing embodiment are the slits 20 formed in the upper electrode 21, the one ends of the slits 20 located adjacent to the signal line 16 being the open ends 20a which have greater width than the other ends, or the close ends 20b, so that the upper electrode 21 exhibits the comb shape when seen from plan view. However, both ends may be the close ends. Also, the upper electrode 21 is exemplary described in the foregoing embodiment such that the upper electrode 21 is not located at the position above the TFT, however, other structures may be employed.

The liquid crystal display device 1 of the FFS type is described as one embodiment of the invention. Such liquid crystal display device of present invention may be employed in various kinds of electronic equipment, such as a personal computer, a cellular phone, a personal digital assistant, a navigation system, a portable audio player and a portable television.

Second Embodiment

Also, according to the first embodiment, described is the structure in the liquid crystal display device 1 such that each of the lower electrodes (first electrodes) 17 is connected to each of the drain electrodes D so as to serve as the pixel electrode and the upper electrodes (second electrodes) 21 are, as a unit, connected to the common lines Com so as to serve as the common electrode. However, the lower electrodes 17 can be operated as the common electrode and the upper electrodes 21 can be operated as the pixel electrodes.

The manufacturing process for the liquid crystal display devices having such structure will now be described. Firstly, the array substrate AR is manufactured through the same process as the foregoing embodiment until the intermediate film 14 is deposited. Then, the lower electrode 17 is deposited overlying the entire display area DA except the positions at which the contact hole portions CH and the opening portions OP are formed and electrically connected to the common lines Com. After that, the electrodes-insulation film (second insulation film) 18 is deposited overlying the surface of the substrate except the positions in which the contact hole portions CH are formed. By depositing the electrodes-insulation film 18 in such manner, the electrodes-insulation film 18 extends to the inside of the opening portion OP so as to directly overlie the channel region CR. Then, the upper electrode 21 having the pluralities of slits 21 is deposited in each of the pixel regions defined by the scanning lines 12 and the signal lines 16. Note that the upper electrode 21 is electrically connected to the drain electrode D via the contact hole portion CH and is not formed at the position at which the opening portion OP is formed. The remainder of the manufacturing process is the same as that of the liquid crystal display device 1 of the foregoing embodiment. More particularly, manufacture of the liquid crystal display device is completed via other processes such as depositing the aliment layer to the array substrate AR and bonding the AR to the color filter substrate CF.

It should be appreciated that similar advantages to the liquid crystal display device 1 of the embodiment can be obtained with the liquid crystal display device in which the lower electrodes 17 serves, as a unit, as the common electrode and the upper electrodes 21 serve as the pixel electrodes.

What is claimed is:

1. A liquid crystal display device comprising:
   a pair of transparent substrates which clamp a liquid crystal layer therebetween, one of the transparent substrates carrying a plurality of scanning lines and signal lines arranged in matrix with a first insulation film therebetween on a surface adjacent to the liquid crystal layer thereof, switching devices made of a thin film transistor, the switching devices being positioned at vicinities of intersections of the scanning lines and the signal lines, an intermediate film overlying a entire surface of a displaying area, first electrodes made of a transparent conductive material and connected to electrodes of the switching devices via contact hole portions formed through the intermediate film each contact hole portion positioned in each of regions defined by the scanning lines and the signal lines, second electrodes made of a transparent conductive material, and a second insulation film sandwiched between the first electrodes and the second electrodes,
   wherein the electrodes of the switching devices are directly covered with the intermediate film;
   wherein channel regions of the switching devices are directly covered with the second insulation film at opening portions formed in the intermediate film;
   wherein the second electrodes are, as a unit, connected to a common line wired on an external periphery of the displaying area; and
   wherein the second insulation film is made of an inorganic transparent insulation material.

2. The liquid crystal display device according to claim 1, wherein the thickness of the second insulation film is in a range of 2000 angstrom to 6000 angstrom.

3. A process for manufacturing a liquid crystal display device, comprising the steps of: a first step in which a transparent substrate is prepared as a first transparent substrate, the trans parent substrate having a plurality of scanning lines and signal lines arranged in matrix with a first insulation film therebetween and in a displaying area, switching devices made of a thin film transistor, the switching devices being positioned at vicinities of intersections of the scanning lines and the signal lines, and a common line formed along a periphery of the displaying area; a second step in which an intermediate film is formed by forming a film made of a photosensitive resin material overlying an entire surface of the transparent substrate that has undergone the first step, and then conducting exposing, developing and baking so that the intermediate film overlying an entire displaying area is formed, the intermediate film having contact hole portions and opening portions so that electrodes and channel regions of the switching devices are exposed; a third step in which first electrodes made of a transparent conductive material are formed in regions defined by the plurality of scanning lines and the plurality of signal lines, each first electrode being positioned in each region, and each of the first electrodes and each of the switching devices are electrically connected via the contact hole portions; a fourth step in which a second insulation film is deposited on an entire surface of the intermediate film including positions corresponding to the first electrodes and the channel regions; a fifth step in which second electrodes made of a transparent conductive material are formed at positions corresponding to the regions defined by the plurality of scanning lines and the plurality of the scanning lines and the plurality of the signal lines, each of the second electrodes having a plurality of slits; and a sixth step in which an alignment layer is deposited on the surface of the first transparent substrate that has undergone the fifth step, a second transparent substrate is positioned with facing the first transparent substrates and bonded to the first transparent substrate with being separated at a predetermined distance, and a liquid crystal is received between the first transparent substrate and the second transparent substrate.

4. A liquid crystal display device comprising:
   a pair of transparent substrates which clamp a liquid crystal layer therebetween, one of the transparent substrates carrying
   a switching devices made of a thin film transistor,
   an intermediate film overlying a entire surface of a displaying area,
   a first electrodes connected to electrodes of the switching devices via contact hole portions formed through the intermediate film,
   a second electrodes, and
   a insulation film sandwiched between the first electrodes and the second electrodes,
   wherein channel regions of the switching devices are directly covered with the insulation film at opening portions formed in the intermediate film; and
   wherein the second electrodes are connected to a common line wired on an external periphery of the displaying area; and
   wherein the insulation film is made of an inorganic transparent insulation material.

* * * * *